(No Model.)

T. A. EDISON.
ELECTRICAL CONDUCTOR.

No. 297,586.   Patented Apr. 29, 1884.

ATTEST:

INVENTOR:
Thomas A. Edison,
By Rich. N. Dyer,
Atty.

UNITED STATES PATENT OFFICE.

THOMAS A. EDISON, OF MENLO PARK, NEW JERSEY.

ELECTRICAL CONDUCTOR.

SPECIFICATION forming part of Letters Patent No. 297,586, dated April 29, 1884.

Application filed October 10, 1883. (No model.)

*To all whom it may concern:*

Be it known that I, THOMAS A. EDISON, of Menlo Park, in the county of Middlesex and State of New Jersey, have invented a new and useful Improvement in Electrical Conductors, (Case No. 596,) of which the following is a specification.

The object of this invention is to effectively insulate electrical conductors, the mode of insulation being especially adapted for conductors which are to form the inductive portions of the rotating armatures of dynamo-electric machines.

The invention consists, mainly, in the use of parchment-paper provided with a retaining-covering of fibrous material, braided, wound, or otherwise formed thereon. The parchment-paper may or may not be covered with Japan varnish. Being non-porous, this insulation does not allow the electricity to penetrate through it, and it is also a good conductor of heat, which it conveys from the armature coils or bars. Parchment-paper used alone possesses these characteristics to a degree practically sufficient, though the japanning of the paper increases them to some extent. I take a continuous strip of the parchment-paper and wind it spirally upon the conductor with the edges of the strip overlapping, so as to completely cover said conductor. The retaining-covering is of any suitable fibrous material, and is preferably braided tightly upon the parchment-covered conductor, though it may be wound thereon or otherwise applied. It keeps the parchment-paper in place and prevents it from unwinding from the conductor. Wire of any size, or the copper inductive bars used in large machines, may be insulated in this way, or a number of wires forming one conductor may be included in the same wrapping.

Figure 1:
Figure 2:
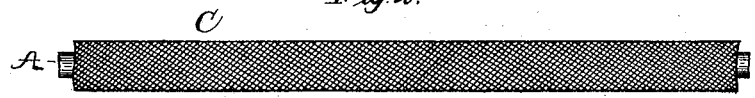
Figure 3:

In the accompanying drawings, Figure 1 represents the wire wound with the spiral strip of parchment-paper; Fig. 2, the same with the retaining-covering braided thereon, and Fig. 3 an enlarged section of the complete insulated conductor.

A is a wire upon which is spirally wound the parchment-paper B, and over this is braided the retaining-covering C.

What I claim, is—

1. The combination, with an electrical conductor, of a strip of parchment-paper wound spirally thereon, and a braided or wound retaining-covering, substantially as set forth.

2. As an insulator for electrical conductors, japanned parchment-paper, substantially as set forth.

3. The combination, with an electrical conductor, of a strip of japanned parchment-paper wound spirally thereon with its edges overlapping, and a retaining-covering, substantially as set forth.

This specification signed and witnessed this 14th day of September, 1883.

THOS. A. EDISON.

Witnesses:
H. W. SEELY,
EDWARD H. PYATT.